United States Patent Office 3,321,559
Patented May 23, 1967

3,321,559
KILN OPERATION
Aage M. Tvergaard, Albert H. Pack, and William W. Campbell, Ludington, Mich., and Earl Leatham, Wexford, Pa., assignors to Harbison-Walker Refractories Company, Pittsburgh, Pa., a corporation of Pennsylvania
Filed Nov. 17, 1964, Ser. No. 411,926
The portion of the term of the patent subsequent to Jan. 12, 1982, has been disclaimed
6 Claims. (Cl. 263—52)

This application is a continuation-in-part of our copending application Ser. No. 251,415, filed Jan. 14, 1963, now Patent No. 3,165,304.

This invention relates to the construction and operation of high temperature shaft kilns. More particularly, it relates to improved shaft kiln construction suitable for dead burning magnesite and the like.

The art of kiln construction is very old and the literature, particularly the patent literature, is replete with suggested constructions and methods of operation for kilns. One segment of the art of kiln construction or design relates to what is sometimes termed shaft kiln design. Shaft kilns are usually vertical kilns in which a charge of material, to be treated, is passed downwardly through the open top of the kiln in counter-current flow to an upwardly moving stream of hot gas. This type of kiln has been employed most frequently in the calcining of limestone. In calcining limestone, it is desired to drive off certain natural constituents to obtain a chemically reactive product. The chemical equation $CaCO_3 + heat \rightarrow CaO + CO_2$ is indicative of the primary reaction which occurs in the calcining of limestone.

More recently, it has been suggested to dead burn magnesite and dolomite in a shaft kiln. By "dead burn" we mean burn at a very high temperature to produce a relatively nonreactive product. The art of shaft kiln construction for the calcining of limestone is, of course, considered pertinent. However, when one considers that a lime kiln in its hottest zone is usually not above about 1400° C. or 2550° F., it becomes readily apparent that an entirely new technology had to be evolved to construct kilns for dead burning magnesite and dolomite, because the required dead burning temperature for these materials is above about 3000° F. Some kilns, for dead burning magnesite and dolomite, now operate between 4000 and 5000° F. The 4000° F. figure is more applicable to dolomite.

With the lower calcining temperature for limestone, it has been possible to incorporate various modes of auxiliary flow directing apparatus interiorly of the kiln. These have included sequential burning stages, one under the other in a common kiln shell, which tended to assure that all of the charge passing through the kiln was heated to at least the desired disassociation temperature of calcium carbonate. Various internal baffling arrangements have been suggested to deflect gas flow and charge movement to produce intimate admixing interiorly of the kiln. Others have suggested a plurality of juxtaposed ducts, interiorly of a common shell, as another means of assuring intimate association, between the downwardly moving charge of limestone and the upwardly moving charge of hot gases. However, the foregoing arrangements are not suited for the operation of a kiln above about 3000° F., because the temperatures involved are beyond the range of the normally used materials of construction.

A particularly satisfactory design for the refractory lining of tubular shaft kilns, of the type to which this invention relates, is disclosed in copending U.S. patent application Ser. No. 251,415, filed Jan. 14, 1963, owned by a common assignee. In operating kilns of the type disclosed in said copending application, it has been found difficult to cool the product uniformly at or near the bottom discharge, thereby reducing the capicity of the kiln.

Generally, in a shaft kiln, briquettes are fed at a rate of about one lb. per lb. of air which is optimum. The briquettes are fed in such a manner as to provide a continuously descending bed, with the amount of new, cool briquettes, being fed at the top of the kiln, being substantially equivalent to the amount being discharged at the bottom. Fuel, such as natural gas, is introduced to the combustion zone of the kiln at a rate of about 1½ to 2 million B.t.u.'s per ton of briquettes or shapes discharged from the bottom, when burning materials, such as dolomite, magnesite, or lime. The foregoing material balance is necessary for both fuel economy and for maintaining high temperatures in the burning zone near the center of the kiln.

The optimum feed rate, mentioned above, is based on the fact that the specific heat of air and magnesite, dolomite, or lime is approximately equal. Both the top one-half and the lower one-half of the kiln can be considered as separate heat transfer units. In the bottom half of the kiln, the heat or B.t.u.'s are transferred from the hot briquettes to the air. In the upper one-half of the kiln, heat (B.t.u.'s) is transferred from the hot gas or air to the cold briquettes. In this manner, the briquettes move down into the firing zone at a high temperature; and the air moving up into the firing zone, where the gas is introduced, is also at a high temperature. Under these conditions, very little fuel is required to maintain temperatures of over 4000° F., in the firing zone in the center of the kiln.

This principle can be visualized by considering what happens in the top half and lower half of the kiln, separately. At the hottest zone of the kiln (about midpoint), the briquettes will be over 4000° F. As they move down to the bottom of the kiln, against the air moving up through the kiln, the heat is transferred from the hot briquettes to the air. Since the specific heat of air and refractory material is substantially equal, when one lb. of material is cooled 1° F. by the colder air, one B.t.u. will be transferred to one lb. of air and the air will be increased 1° F. With perfect heat transfer, all of the heat would be transferred to the air by the time the briquettes reach the bottom of the kiln, and the air would be at the maximum of 4000° F. coming into the hot zone at the midpoint of the kiln. But since there are heat losses and imperfect heat transfer, the temperature of the air will be less than 4000° F. If 2 lbs. of air are introduced (rather than 1 lb.) for each 1 lb. of material, then the air will be preheated to only one-half the temperature which would be obtained if one lb. of air, per lb. of material, were fed to the kiln. To obtain high temperatures, the air must be preheated to the maximum, by the time the air reaches the burning zone in the center of the kiln. If less than 1 lb. of air per lb. of material is added to the kiln, then there is not enough air to strip the heat from the briquettes; and valuable heat will be lost with the hot briquettes at the bottom of the kiln.

The top one-half of the kiln can be considered as a heat transfer unit, in which the heat from the hot gas and air is transferred to the cold briquettes moving down to the hot zone. If more than 1 lb. of air and gas is moving up the kiln, for each lb. of material moving down the kiln, then there will not be enough briquettes for complete transfer of heat or B.t.u.; and hot gas and air will escape from the top of the kiln; and the hot zone will move up above the center of the kiln. If less than 1 lb. of air and gas is used, not enough heat or B.t.u.'s will be transferred to the briquettes by the time they reach the hot zone.

Kilns, utilizing the optimum feed rate described above, were designed to handle about 4.5 tons of material per hour.

Accordingly, it is an object of this invention to increase the capacity of high temperature shaft kilns.

It is another object of the invention to cool briquettes passing from the hot zone of a shaft kiln, more rapidly, than was heretofore possible without deviating from optimum feed rates.

Other objects, and further features and advantages of this invention, will become readily apparent to those skilled in the art from a study of the following detailed description, with reference to the appended drawings. In these drawings.

Briefly, the invention is predicated upon the discovery that the operating capacity of a vertical kiln, having a downwardly moving bed of charge materials, may be increased from the normal 4.5 tons per hour up to 10 tons per hour. This is accomplished by passing a stream of air, at least 10% in excess of that required to maintain optimum charge material balance (i.e. 1 lb. of air per lb. of charge), upwardly, through an apertured discharge table supporting material which has been dead burned, and then removing said excess air while simultaneously discharging the cooled material from said table. Thus, the balance of the air passes to the kiln passage, in an upwardly moving countercurrent flow, to the downwardly moving charge of material to be dead burned.

Before describing the drawings in detail, it should be understood they are but exemplary of construction, embodying the process of our invention, and are given by way of explanation and not by way of limitation.

Figure 2:
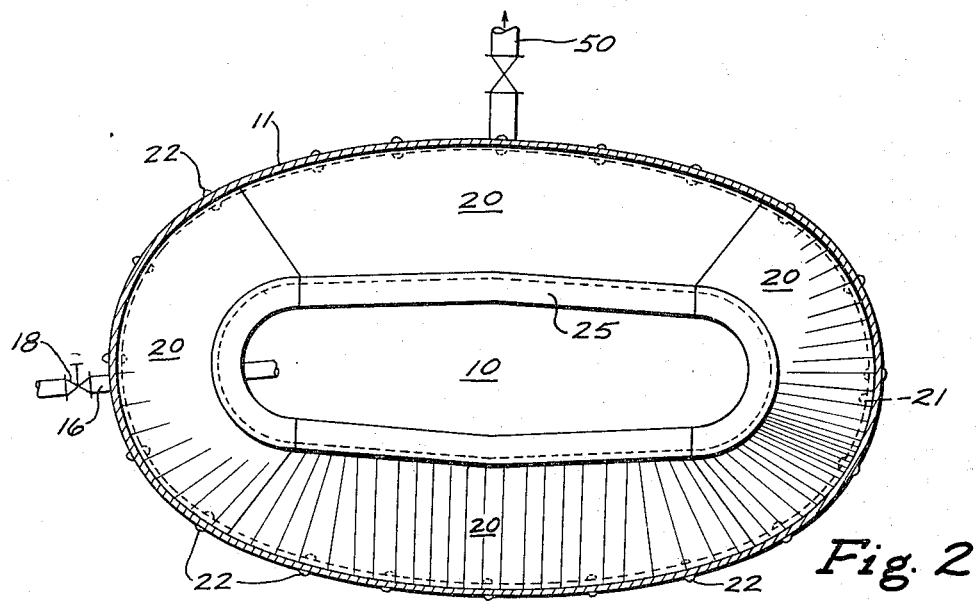
FIG. 2 is a view taken along the line 2—2 of FIG. 1.
Figure 1:
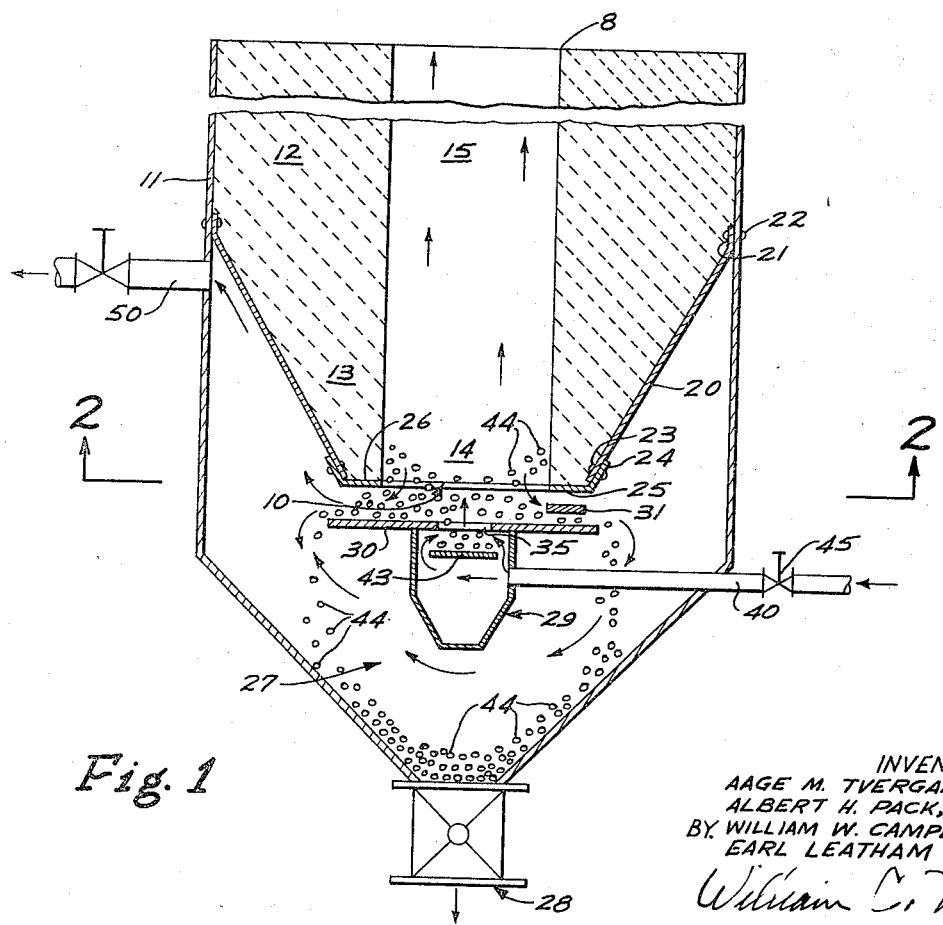
FIG. 1 is a schematic side elevation in partial section of a high temperature shaft kiln embodying the process of this invention.

In FIG. 1 there is shown a vertical kiln, which is capable of dead burning refractory material above about 3000° F. and which may utilize the process of the invention. The kiln includes an upper inlet 8 and a bottom outlet 10, defined by the concentric relatively thin tubular outer shell 11 and the internal refractory lining 12. Refractory lining 12 is of substantial thickness and may be on the order of two or three feet, as compared to about ½ inch thickness for the shell 11. A burner 16, having a suitable valve 18 (FIG. 2), is positioned at the dead burning zone, intermediate the ends of the kiln, for attaining temperatures of at least about 3000° F.

A plurality of curved bottom plates 20 are arranged to form an inwardly converging skirt, of such dimensions as to contiguously abut and support the downwardly converging outer surface of the truncated bottom portion 13 of the refractory lining 12. The plates 20 have flanges 21 formed about their upper peripheries. The flanges 21 have a plurality of apertures formed therethrough, adapted for cooperation with bolts 22, and apertures formed through the shell 11 to support the plates 20. The other end 23, of each of the plates 20, is likewise apertured and arranged to have the upwardly extending ear 24 of the retainer ring 25 bolted thereto. The ring 25 is arranged to contiguously abut and support the bottom face 26 of the conical portion of the lining.

The converging portion 13 of the lining is characterized as a generally downwardly, converging truncated elliptical cone 13, having a tubular passage 14 of substantially uniform cross section passing therethrough. The cross-sectional configuration of the passage, through the truncated elliptical cone section of the lining, is substantially the same as the cross-sectional configuration of the passage 15, through the refractory lining immediately thereabove.

It is preferred that the slope, of the downward convergence of the outer surface of the bottom of the lining, be on the order of about 30° relative to the vertical. However, this angle is variable as long as a small lip remains at the bottom to form the surface 26, in order to provide better support for the lining. Alternatively, a plurality of lugs (not shown) may be driven through plates 20 into the cone portion 13 to provide extra support. Of course, a retainer ring and lugs may be used. In a preferred embodiment, the outer shell 11 extends a distance beyond the bottom of the refractory lining and, then, converges to form a chamber 27 below plates 20, having a bottom outlet 28.

In a preferred construction, an air manifold 29 is positioned below the discharge table 30. A drag bar 31 is positioned between the retaining ring 25 and the upper surface of the discharge table 30. Opening through the discharge table are a series of apertures 35, interconnected with the manifold 29 through a plurality of separate conduits 40. A baffle 43, beneath each aperture 35, prevents briquettes 44 from filling the manifold. Each of the conduits 40 has a suitable valve 45 included therein. Also, an air outlet 50 opens through that portion of the shell 11 below the refractory lining 13. By suitable manipulation of the valves 45, the cross-sectional configuration of air, being introduced into the bottom of the kiln, may be adjusted to offset horizontal nonuniformity in the product temperatures.

By introducing air through a manifold arrangement, such as shown in the drawings, it has been found that the average temperature of briquettes, being discharged from the bottom of the shaft kiln, can be reduced by as much as 500° F. In addition to better cooling of the briquettes, the air is more uniformly preheated by the time it reaches the combustion zone of the kiln. In one campaign, production was increased by about 20 percent over construction without the manifold. Also, the product was more uniform.

In order to obtain still further benefits in the foregoing arrangement, an extra 10 to 100% of air, over that blown up through the charge, is introduced into the kiln through the manifold arrangement, to further cool the briquettes discharging from the bottom of the kiln. This excess air is then continuously drawn off through conduit 50. This rapid cooling of the briquettes allows the kiln to operate at a higher capacity than was possible previously.

Figure 3:
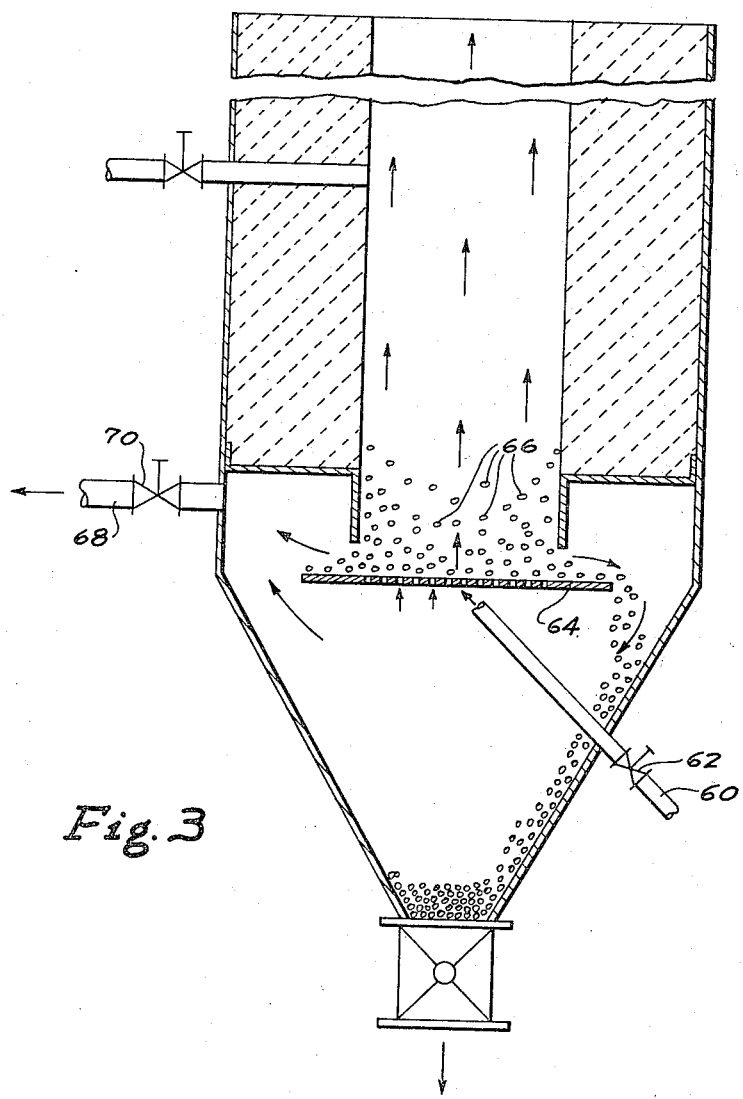
FIG. 3 is a schematic side elevation in partial section of an alternate shaft kiln design embodying the process of this invention.

In FIG. 3, there is shown an alternate kiln design without the manifold of FIG. 1. Here, a conduit 60, having a suitable valve 62, is located directly beneath the apertured discharge table 64. The air is introduced through conduit 60 and passes up through the table 64 and dead burned material 66 resident thereon. The excess air is removed from the kiln through conduit 68 by control of the valve 70.

As an example, a shaft kiln, similar to that shown in FIG. 1 but without the downwardly converging, truncated cone, was employed to process green briquettes of magnesite. The kiln was fired with 7375 cu. ft. of gas per hour to obtain a temperature of about 4000° F. in the dead burning zone. The briquettes were fed at a rate of 6 tons per hour, and air was passed through the discharge table at a rate of 8 tons per hour. After the air passed through the dead burned briquettes, air was removed at the rate of 2 tons per hour; and the balance passed, upwardly, through the passage in the kiln to the combustion zone and briquettes to be dead burned, so that there was 1 lb. of air for every lb. of charge. Kilns, employing the described process, may be operated at a capacity of up to 10 tons per hour, if desired. A kiln, similar in design but not using the process of the invention, operated at a capacity of only about 4 tons per hour.

It should be understood that differently designed kilns, utilizing a moving bed charge material, may also employ the process of the invention with similar success.

Having thus described the invention in detail and with sufficient particularity as to enable those skilled in the art to practice it, what we desire to have protected by Letters Patent is set forth in the following claims.

We claim:

1. In a method for operating a vertical kiln of the type capable of dead burning refractor material above about 3000° F. and including a tubular outer shell having a refractory lining contiguously positionsed therein to define a vertical passage, means arranged for providing said temperature in a dead burning zone, means defining an upper inlet and a bottom outlet, an apertured discharge table spaced beneath the kiln outlet, and in which a charge material is moved continuously downwardly in the passage through the dead burning zone and is deposited in said discharge table after dead burning, the improvement comprising passing a stream of air, in amounts at least 10% in excess of that required to maintain optimum charge material balance, upwardly through the discharge table and dead burned material residing thereon, removing only said excess air while simultaneously discharging the cooled material from said table and passing the balance of said air through the kiln vertical passage in an upwardly moving countercurrent flow to the downwardly moving charge of material to be dead burned.

2. In a method for operating a vertical kiln of the type capable of dead burning refractory material above about 3000° F. and including a tubular outer shell having a refractory lining contiguously positioned therein to define a vertical passage, means arranged for providing said temperature in a dead burning zone, means defining an upper inlet and a bottom outlet, and an apertured discharge table spaced beneath the kiln outlet, the steps comprising continuously feeding a charge material to the vertical passage at the inlet, dead burning said material, passing a steam of air, in amounts at least 10% in excess of that required to maintain optimum charge material balance, upwardly through the discharge table and dead burned material residing thereon, thereafter removing only said excess air while simultaneously discharging the cooled material from said table, and passing the balance of said air through the kiln vertical passage in an upwardly moving countercurrent flow to a downwardly moving charge of material to be dead burned.

3. In a method for operating a vertical kiln of the type capable of dead burning refractory material above about 3000° F. and including a tubular outer shell having a refractory lining contiguously positioned therein to define a vertical passage, means arranged for providing said temperature in a dead burning zone, means defining an upper inlet and a bottom outlet, an apertured discharge table spaced beneath the kiln outlet, manifold means including a plurality of separate compartments supported beneath the discharge table so that at least one of its compartments open through one of the discharge table apertures, the steps comprising continuously feeding a charge material to the vertical passage at the inlet, dead burning said material, passing a stream of air to the manifolds, in amounts at least 10% in excess of that required to maintain optimum charge material balance, and upwardly through the discharge table and dead burned material residing thereon from a downwardly moving bed thereof, thereafter, removing only said excess air while simultaneously discharging the cooled material from said table and passing the balance of said air through the kiln vertical passage in an upwardly moving countercurrent flow to a downwardly moving charge of material to be dead burned.

4. The method of claim 3 in which the charge material passes through the kiln at a rate of up to 10 tons per hour.

5. In a method for operating a vertical kiln of the type capable of dead burning refactory material above about 3000° F. and including a tubular outer shell having a refractory lining contiguously positioned therein to define a vertical passage, means arranged for providing said temperature in a dead burning zone, means defining an upper inlet and a bottom outlet, an apertured discharge table spaced beneath the kiln outlet, the bottom of said refractory lining, a substantial distance below the dead burning zone of kiln, being characterized as a downwardly converging truncated cone having a tubular passage of substantially uniform cross section passing therethrough, plate means carried by the kiln in position to contiguously abut and support the exterior downwardly converging surface of the refractory lining, and manifold means including a plurality of separate compartments supported beneath the discharge table so that at least one of its compartments opens through one of the discharge tables apertured, the steps comprising continuously feeding a charge material to the vertical passage at the inlet, dead burning said material, passing a stream of air to the manifolds, in amounts at least 10% in excess of that required to maintain optimum charge material balance, and upwardly through the discharge table and dead burned material residing thereon from a downwardly moving bed thereof, thereafter, removing only said excess air while simultaneously discharging the cooled material from said table and passing the balance of said air through the kiln vertical passage in an upwardly moving countercurrent flow to a downwardly moving charge of material to the dead burned.

6. The method of claim 5 in which the air required to maintain optimum charge material balance is 1 lb. per lb. of charge.

References Cited by the Examiner

UNITED STATES PATENTS

| | | | |
|---|---|---|---|
| 2,512,899 | 6/1950 | King | 263—53 |
| 2,628,829 | 2/1953 | Ruiz | 263—29 |
| 2,654,589 | 10/1953 | Somogyi | 263—53 |
| 3,165,304 | 1/1965 | Tvergaard et al. | 263—53 |

TOBIAS E. LEVOW, *Primary Examiner.*

HELEN M. McCARTHY, S. E. MOTT,
*Assistant Examiners.*